United States Patent
Reinke

(10) Patent No.: US 10,125,007 B2
(45) Date of Patent: Nov. 13, 2018

(54) MATERIAL DISTRIBUTION SYSTEM

(71) Applicant: Michael G. Reinke, Monango, ND (US)

(72) Inventor: Michael G. Reinke, Monango, ND (US)

( * ) Notice: Subject to any disclaimer, the term of this patent is extended or adjusted under 35 U.S.C. 154(b) by 0 days.

(21) Appl. No.: 15/435,275

(22) Filed: Feb. 16, 2017

(65) Prior Publication Data

US 2018/0229992 A1 Aug. 16, 2018

(51) Int. Cl.
| | |
|---|---|
| *B67D 7/02* | (2010.01) |
| *B65G 11/02* | (2006.01) |
| *B65G 11/12* | (2006.01) |
| *B65G 11/16* | (2006.01) |
| *B65G 33/14* | (2006.01) |
| *B67D 7/36* | (2010.01) |

(52) U.S. Cl.
CPC .............. *B67D 7/02* (2013.01); *B65G 11/026* (2013.01); *B65G 11/126* (2013.01); *B65G 11/166* (2013.01); *B65G 33/14* (2013.01); *B67D 7/36* (2013.01); *B67D 2210/0016* (2013.01)

(58) Field of Classification Search
CPC ........ B65G 47/72; B65G 47/20; B65G 47/18; B65G 11/166; B65G 11/126; B65B 1/12; B65B 39/007
See application file for complete search history.

(56) References Cited

U.S. PATENT DOCUMENTS

| | | | | |
|---|---|---|---|---|
| 944,354 A | | 12/1909 | Ayars | |
| 2,233,652 A | * | 3/1941 | Ticknor | B65G 65/44 198/533 |
| 2,913,148 A | * | 11/1959 | Charcuset | B65D 88/66 222/227 |
| 2,962,172 A | | 11/1960 | Fath | |
| 4,702,364 A | * | 10/1987 | Johanneck | B65G 11/186 193/14 |
| 8,636,824 B2 | | 1/2014 | Harada | |
| 9,010,382 B2 | * | 4/2015 | Matye | B65B 1/06 141/103 |

* cited by examiner

Primary Examiner — Timothy L Maust
Assistant Examiner — Timothy P Kelly
(74) Attorney, Agent, or Firm — Neustel Law Offices

(57) ABSTRACT

A material distribution system for efficiently distributing a material such as molasses products into one or more containers. The material distribution system generally includes an auger for conveying a material and a hopper connected to the auger. The hopper is adapted to receive the material from the auger. A distributor is rotatably connected below the lower opening of the hopper such that the material may flow through the lower opening into the distributor. A cutter is slideably connected between the hopper and the distributor, wherein the cutter is adjustable between a first position covering the lower opening of the hopper and a second position not covering the lower opening of the hopper. The cutter is adapted to cut through the material such that a portion of the material exits the distributor via an outlet.

20 Claims, 14 Drawing Sheets

MATERIAL DISTRIBUTION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a material distribution system for efficiently distributing a material such as molasses products or mixtures into one or more containers.

Related Art

Any discussion of the related art throughout the specification should in no way be considered as an admission that such related art is widely known or forms part of common general knowledge in the field.

Materials, including fluids and solids, are commonly required to be conveyed into containers in a wide range of industries. As an example, a feed distribution company will often need to fill a large number of containers with molasses products in an efficient manner. In the past, hoppers and the like have been utilized wherein the hopper is not movable.

In such situations, the containers are required to be manually moved under the hopper and then out of the way after being filled. This can be an arduous task, particularly when the filled containers are of such a weight that they need to be moved by a forklift or the like. It would be much more preferable to have a distribution system which may be easily adjusted to fill multiple containers on a single forklift without the need to move any of the containers during the filling operation.

SUMMARY

An example embodiment is directed to a material distribution system. The material distribution system includes an auger for conveying a material and a hopper connected to the auger. The hopper is adapted to receive the material from the auger. A distributor is rotatably connected below the lower opening of the hopper such that the material may flow through the lower opening into the distributor. A cutter is slideably connected between the hopper and the distributor, wherein the cutter is adjustable between a first position covering the lower opening of the hopper and a second position not covering the lower opening of the hopper. The cutter is adapted to cut through the material such that a portion of the material exits the distributor via an outlet.

There has thus been outlined, rather broadly, some of the embodiments of the material distribution system in order that the detailed description thereof may be better understood, and in order that the present contribution to the art may be better appreciated. There are additional embodiments of the material distribution system that will be described hereinafter and that will form the subject matter of the claims appended hereto. In this respect, before explaining at least one embodiment of the material distribution system in detail, it is to be understood that the material distribution system is not limited in its application to the details of construction or to the arrangements of the components set forth in the following description or illustrated in the drawings. The material distribution system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
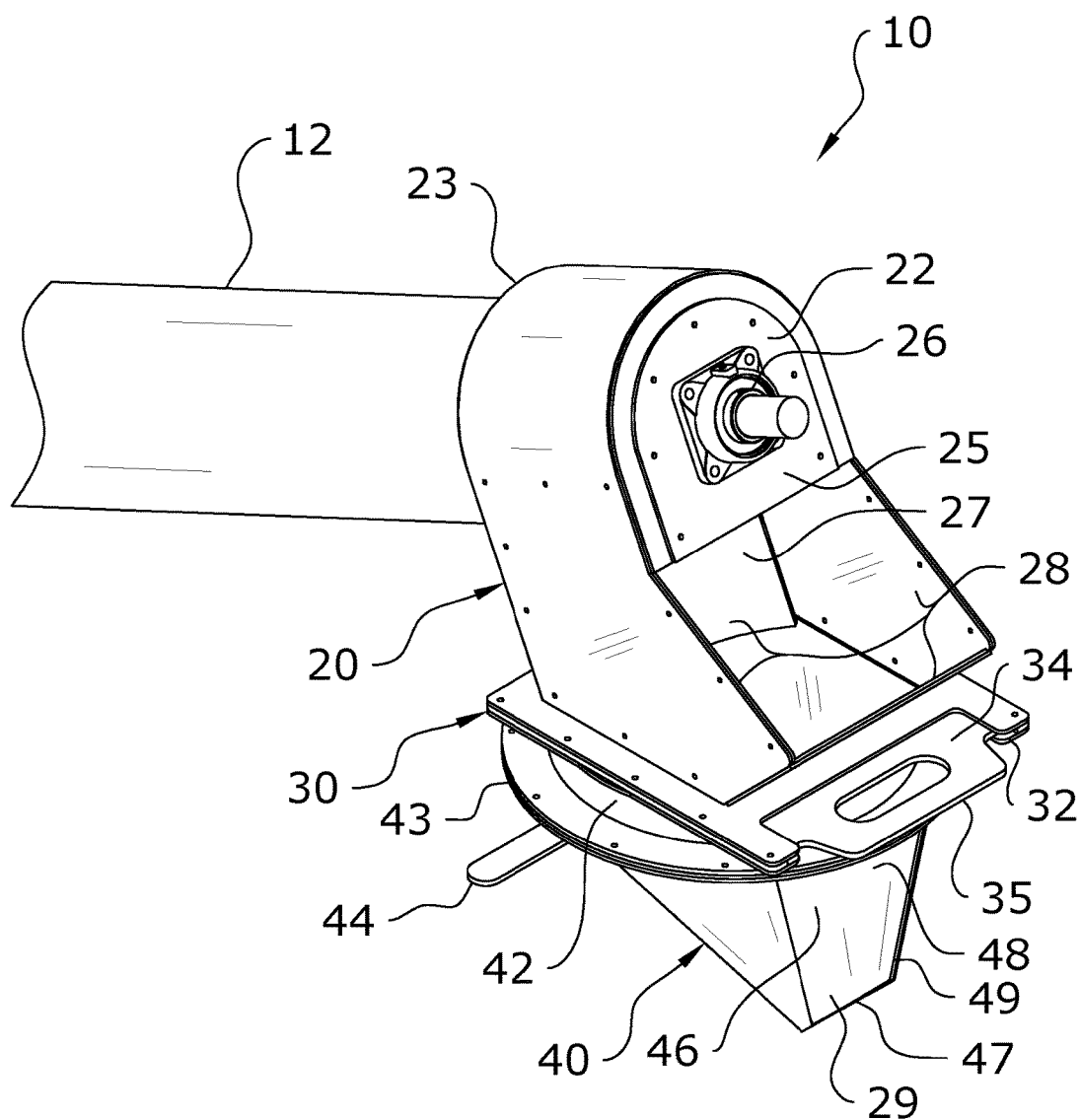
FIG. 1 is a perspective view of a material distribution system with the cutter in the first position in accordance with an example embodiment.

An example material distribution system generally comprises an auger 13 for conveying a material 18 and a hopper 20 connected to the auger 13. The hopper 20 is adapted to receive the material 18 from the auger 13. A distributor 40 is rotatably connected below the lower opening 29 of the hopper 20 such that the material 18 may flow through the lower opening 29 into the distributor 40. A cutter 34 is slideably connected between the hopper 20 and the distributor 40, wherein the cutter 34 is adjustable between a first position covering the lower opening 29 of the hopper 20 and a second position not covering the lower opening 29 of the hopper 20. The cutter 34 is adapted to cut through the material 18 such that a portion of the material 18 exits the distributor 40 via an outlet 47.

B. Material Feeder

Figure 2:
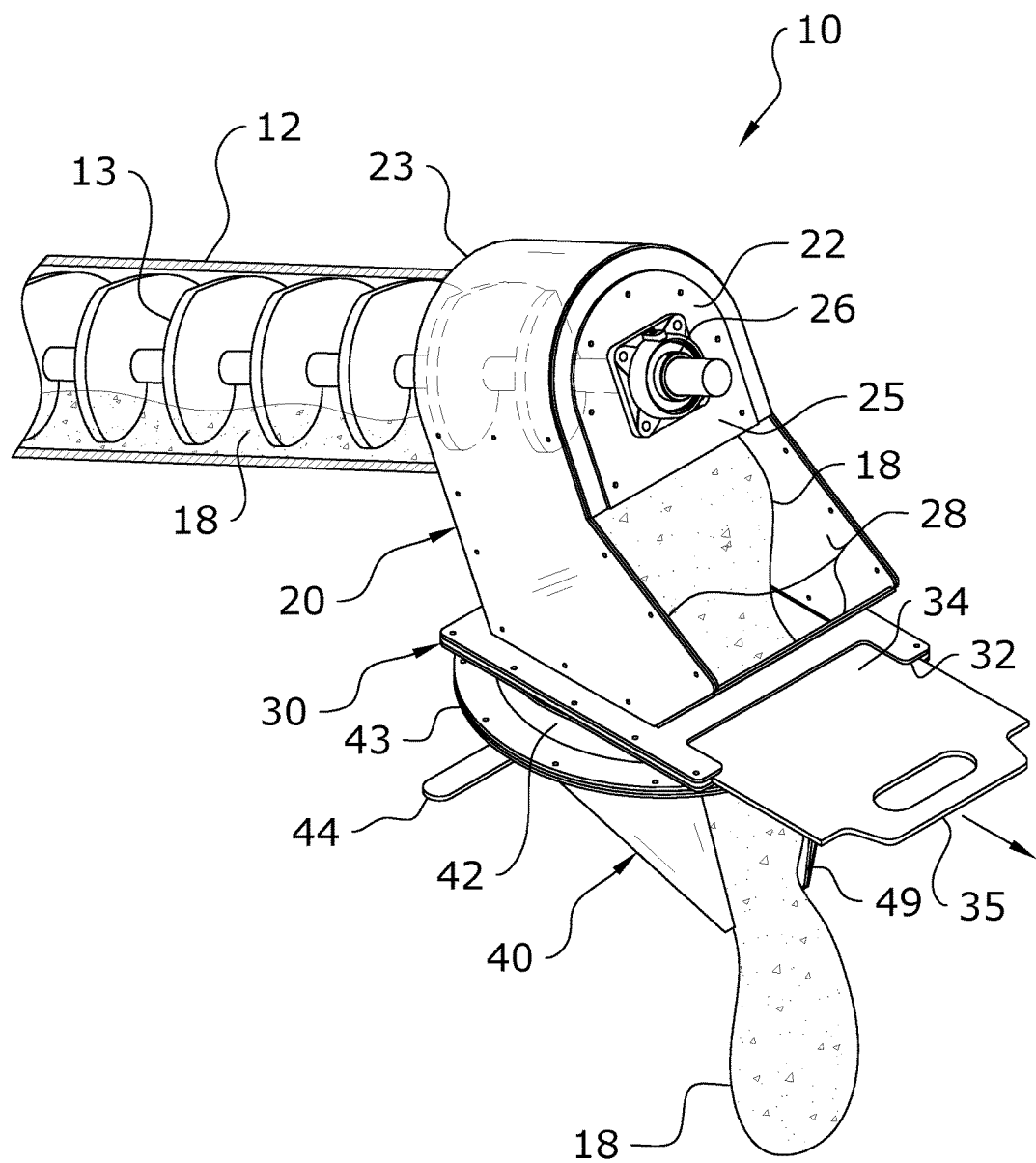
FIG. 2 is a sectional perspective view of a material distribution system with the cutter in the second position and material flowing through the distributor in accordance with an example embodiment.
Figure 3:
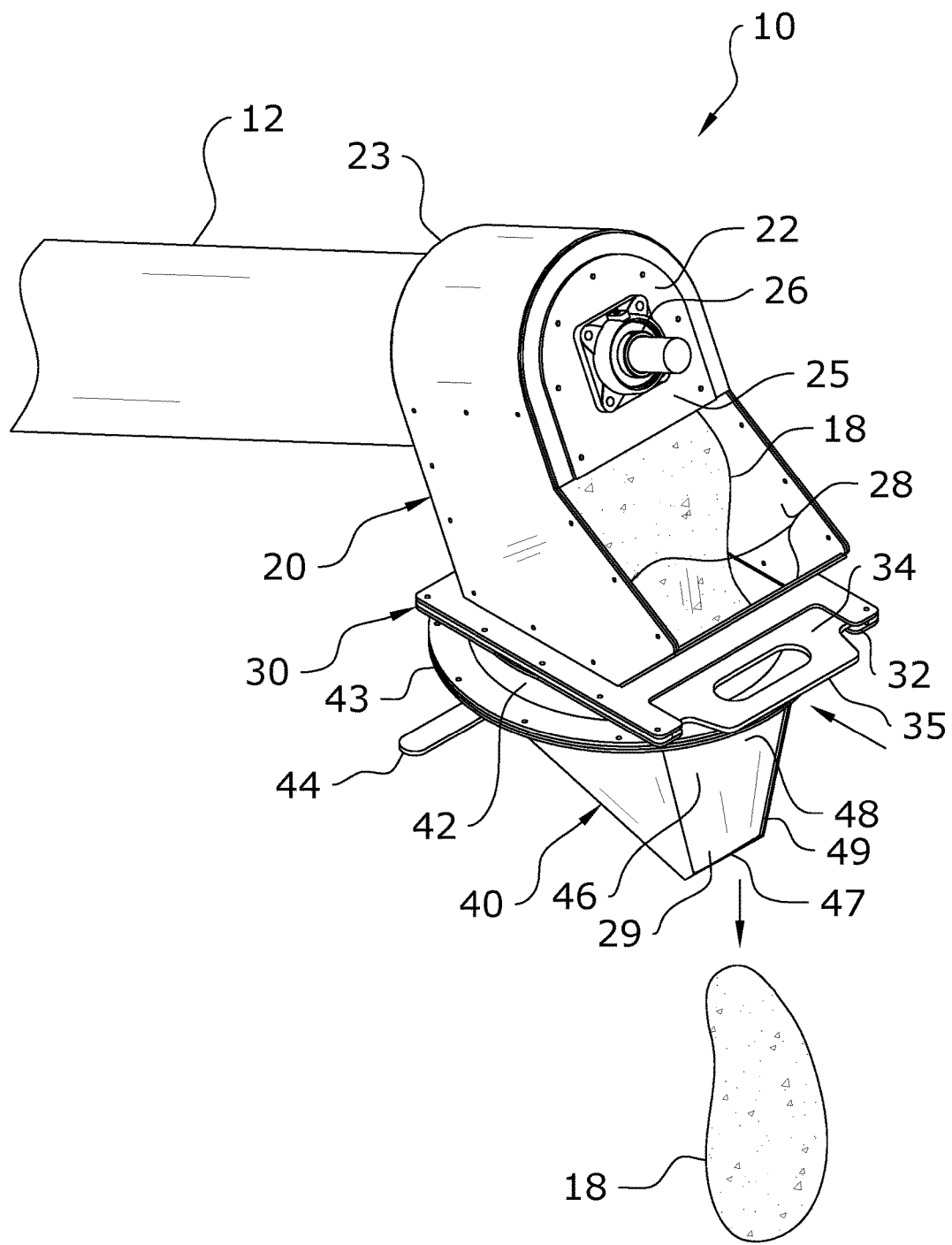
FIG. 3 is a perspective view of a material distribution system with the cutter in the first position and cut material being dispensed by the distributor in accordance with an example embodiment.

As best shown in FIGS. 2-3, a feeder 12 will generally be adapted to feed a material 18 from a source container or the like (not shown) into a hopper 20. The feeder 12 may comprise any device or the like which is adapted to convey a material 18 from one location to another. By way of example and without limitation, the feeder 12 may comprise an auger 13, a conduit, a mixer, or the like.

Various types of materials 18 may be conveyed and distributed via the systems and methods described herein. The materials 18 may comprise a solid, a liquid, or a mixture thereof. The systems and methods described herein are particularly well suited for distribution of materials 18 of high viscosity, such as molasses product. Common materials 18 for use include molasses products, such as molasses mixed with feed or the like. Such high viscosity materials 18 benefit from the use of a cutter 34 which is adapted to cut through the materials 18 as discussed herein.

C. Hopper

As best shown in FIGS. 1-9, a hopper 20 is fluidly connected with the feeder 12. The hopper 20 is adapted to receive the material 18 from the feeder 12. Various types of hopper 20 configurations may be utilized, and thus the exemplary descriptions and figures herein should not be construed as limiting on the scope of the hopper 20.

In the exemplary embodiment shown in the figures, the hopper 20 may comprise a connector portion 22 which is adapted to connect with the feeder 12 such as an auger 13 as shown in FIGS. 1-3 and 10-13. In most embodiments, the connector portion 22 will be located at or near the upper end of the hopper 20. The connector portion 22 may comprise a semi-cylindrical shape as shown in the exemplary figures or may comprise other shapes and configurations.

The connector portion 22 includes a first end 23 having a receiver opening 24 for receiving the feeder 12 and a second end 25 which terminates into a wall having a bearing 26. As best shown in FIG. 2, the outlet of the feeder 12 is connected to the receiver opening 24 of the connector portion 22 of the hopper 20. If an auger 13 is utilized, the auger 13 may be connected to the bearing 26 such as shown in FIGS. 1-3. Thus, the auger 13 will be free to rotate within the second end 25 of the connector portion 22 of the hopper 20.

Beneath the connector portion 22, the hopper 20 will generally include at least one slanted wall 27 along which the materials 18 will fall. Gravity will naturally force the materials 18 down the slanted wall 27 toward the lower opening 29 of the hopper 20. In some embodiments, the slanted wall 27 may be concave so that the materials 18 are naturally centered as they fall toward and through the lower opening 29.

The slanted wall 27, as well as other parts of the hopper 20 which the materials 18 will pass over, may include a first lining 28 such as a plastic liner. The first lining 28 will act to aid the materials 18 with smoothly and efficiently passing through the hopper 20 and into the distributor 40 without catching on the hopper 20.

D. Cutter

As best shown in FIGS. 1-3, a cutter 34 may be slidably connected between the hopper 20 and the distributor 40. The cutter 34 is adjustable between a first position in which the cutter 34 is pushed in to cover the lower opening 29 of the hopper 20 as shown in FIGS. 1 and 3-9 so that materials 18 are prevented from flowing through the lower opening 29 by the cutter 34 and a second position in which the cutter 34 is pulled out and away from the lower opening 29 of the hopper 20 so that materials 18 may freely flow therethrough. In some embodiments, and particularly in embodiments adapted for use with high viscosity materials 18 such as a molasses product, the cutter 34 is adapted to cut through the material 18 such that a portion of the material 18 flows into the distributor 40.

The cutter 34 may be slidably connected between the hopper 20 and distributor 40 such that it may be pushed in or pulled out from the junction between the lower opening 29 of the hopper 20 and the inlet of the distributor 40. In some embodiments such as shown in the figures, a guide member 30 is connected between the hopper 20 and the distributor 40. The guide member 30 may include a slot 32 which the cutter 29 may be pushed into or pulled out of. The guide member 30 may be rectangular as shown in the figures or may comprise other shapes and configurations.

The cutter 34 may comprise various configurations, including a plate, a blade, or the like. The cutter 34 may comprise a plastic material or a metallic material, among other materials. Use of a plastic material for the cutter 34 will reduce the materials 18 being caught on the cutter 34 as the lubricative properties of the plastic material 18 will allow the cutter 34 to cut through the materials 18 smoothly without retaining any materials 18 on the cutter 34. The cutter 34 may be substantially rectangular as shown in the figures or may comprise other shapes. In some embodiments, the cutter 34 may include a cutter handle 35, such as a cutout as shown in the figures, to ease pulling the cutter 34 out from between the hopper 20 and distributor 40.

E. Distributor

As shown throughout the figures, a distributor 40 is rotatably connected beneath the hopper 20 such that materials 18 from the hopper 20 flow through the distributor 40 when the cutter 34 is in its pulled away position. The shape and configuration of the distributor 40 may vary and should not be construed as limited by the exemplary figures. In some embodiments, the distributor 40 may comprise a substantially conular shape as shown in the figures.

The distributor 40 is preferably rotatably connected beneath the hopper 20 such that the outlet 47 of the distributor 40 may be rotated to flow into different containers 16 without having to move the containers 16 themselves such as shown in FIGS. 10-13. The distributor 40 may include a rotator 42 such as a bearing or the like which allows for the rotation. Any structure or device known to allow one structure to rotate with respect to another structure may be utilized.

Figure 4:
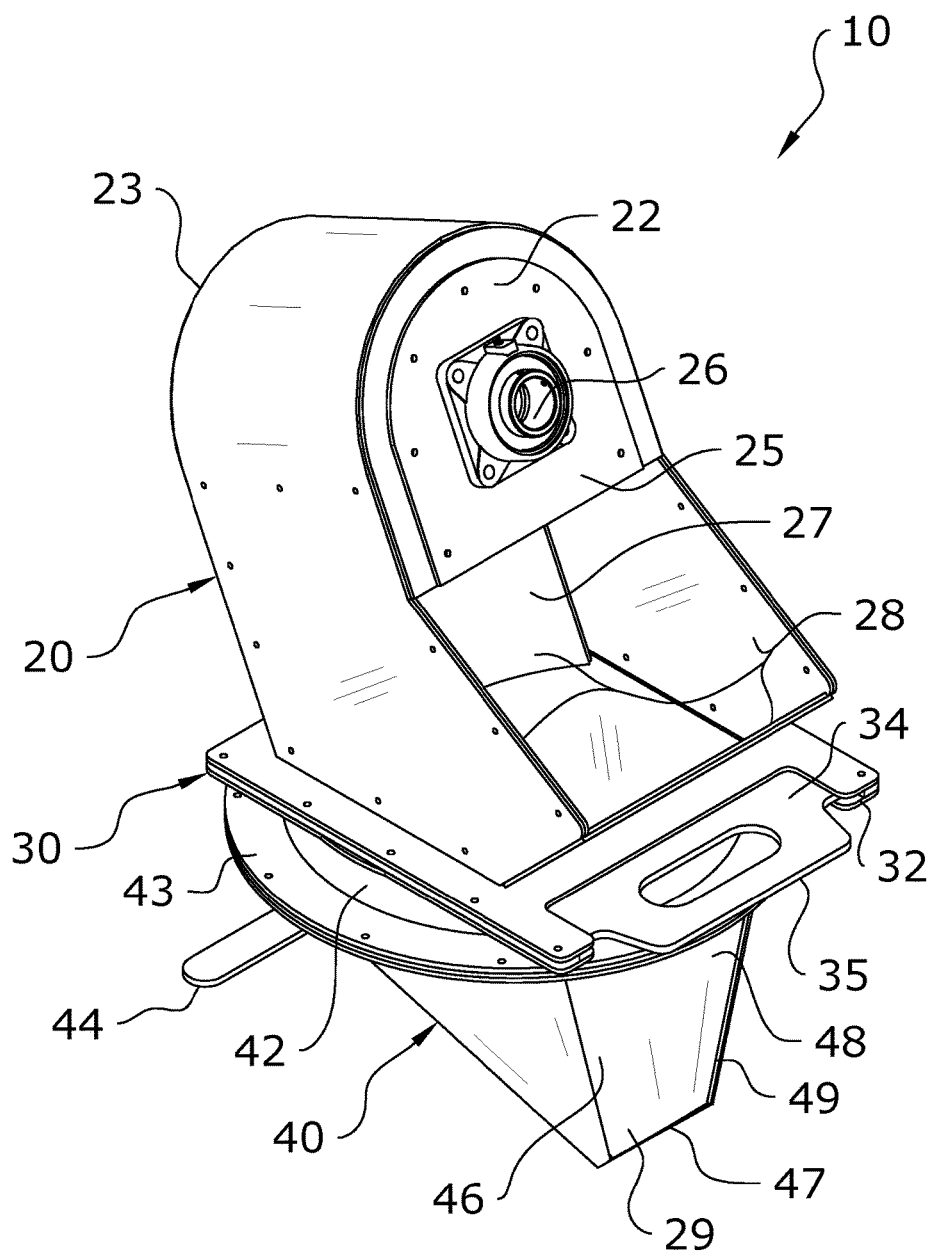
FIG. 4 is a frontal perspective view of a material distribution system in accordance with an example embodiment.
Figure 5:
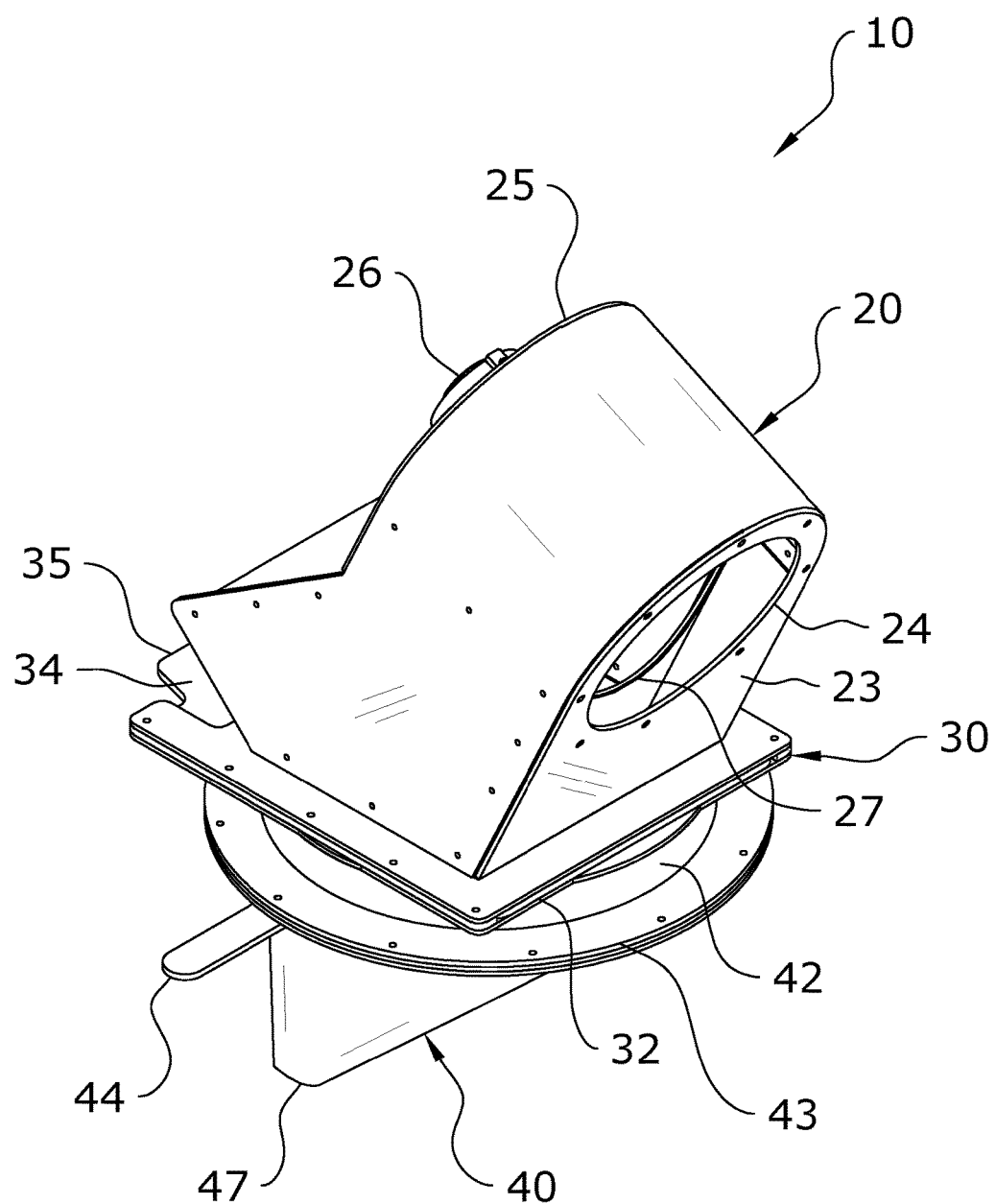
FIG. 5 is a rear perspective view of a material distribution system in accordance with an example embodiment.
Figure 6:
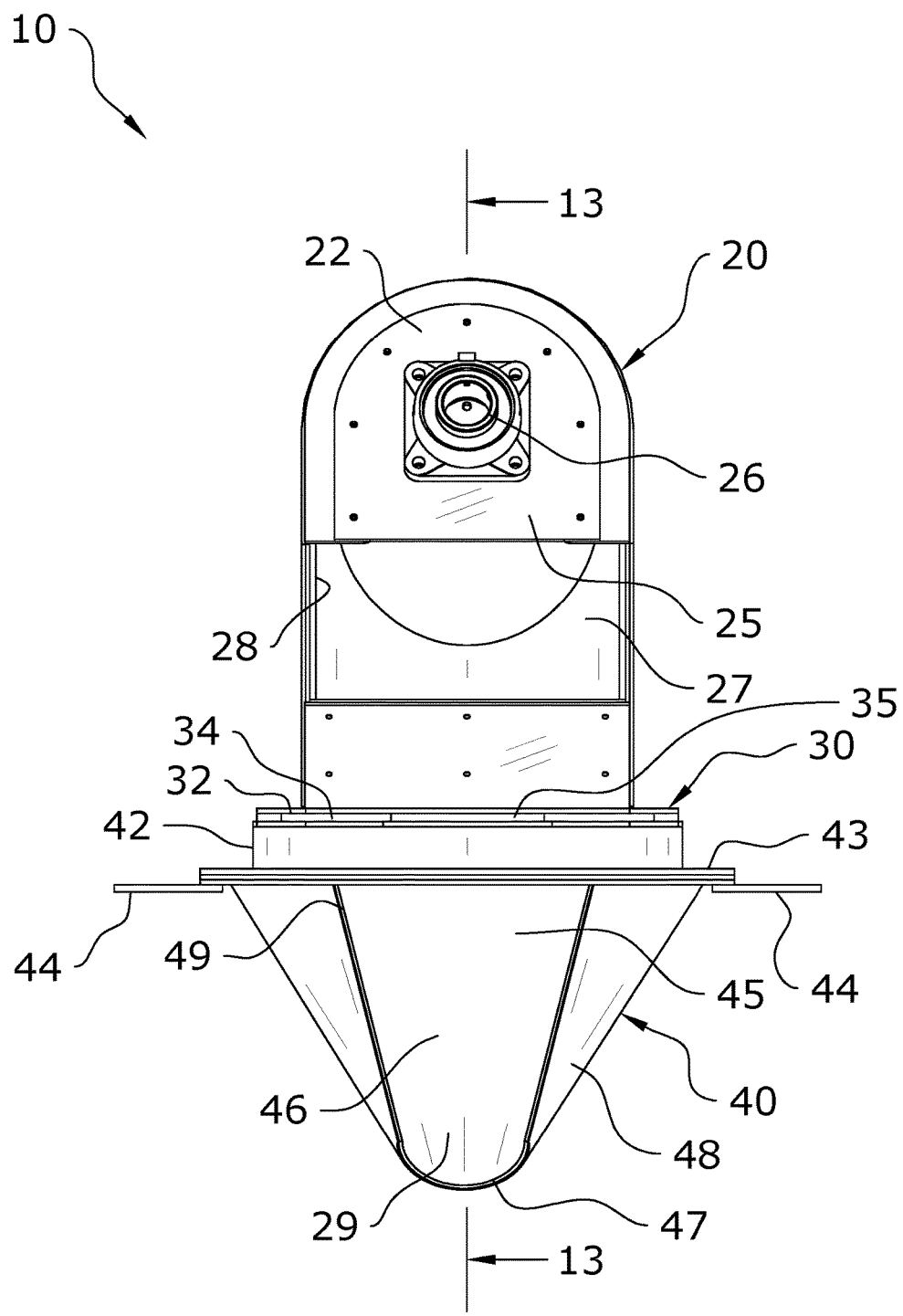
FIG. 6 is a frontal view of a material distribution system in accordance with an example embodiment.
Figure 7:
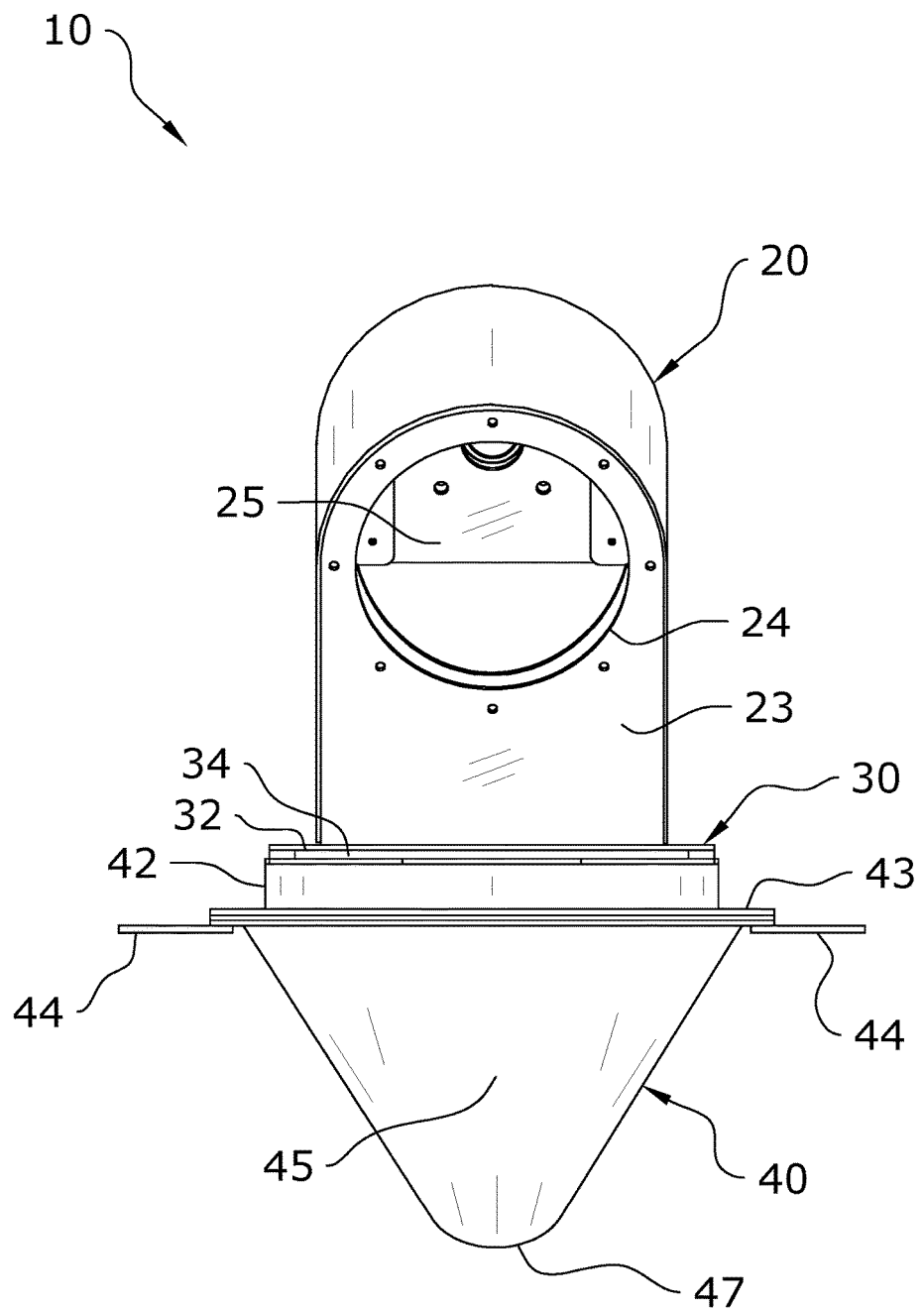
FIG. 7 is a rear view of a material distribution system in accordance with an example embodiment.
Figure 8:
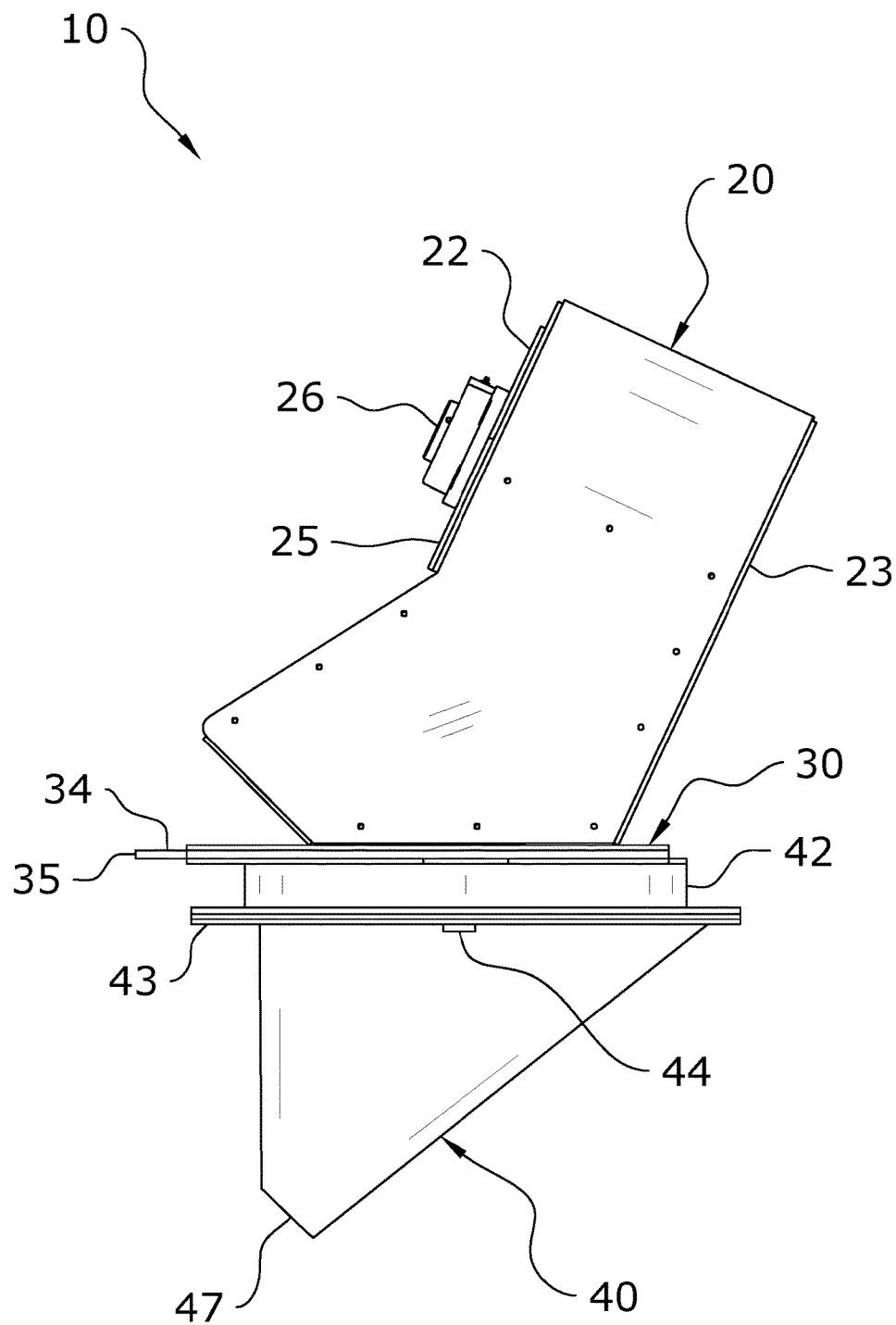
FIG. 8 is a first side view of a material distribution system in accordance with an example embodiment.
Figure 9:
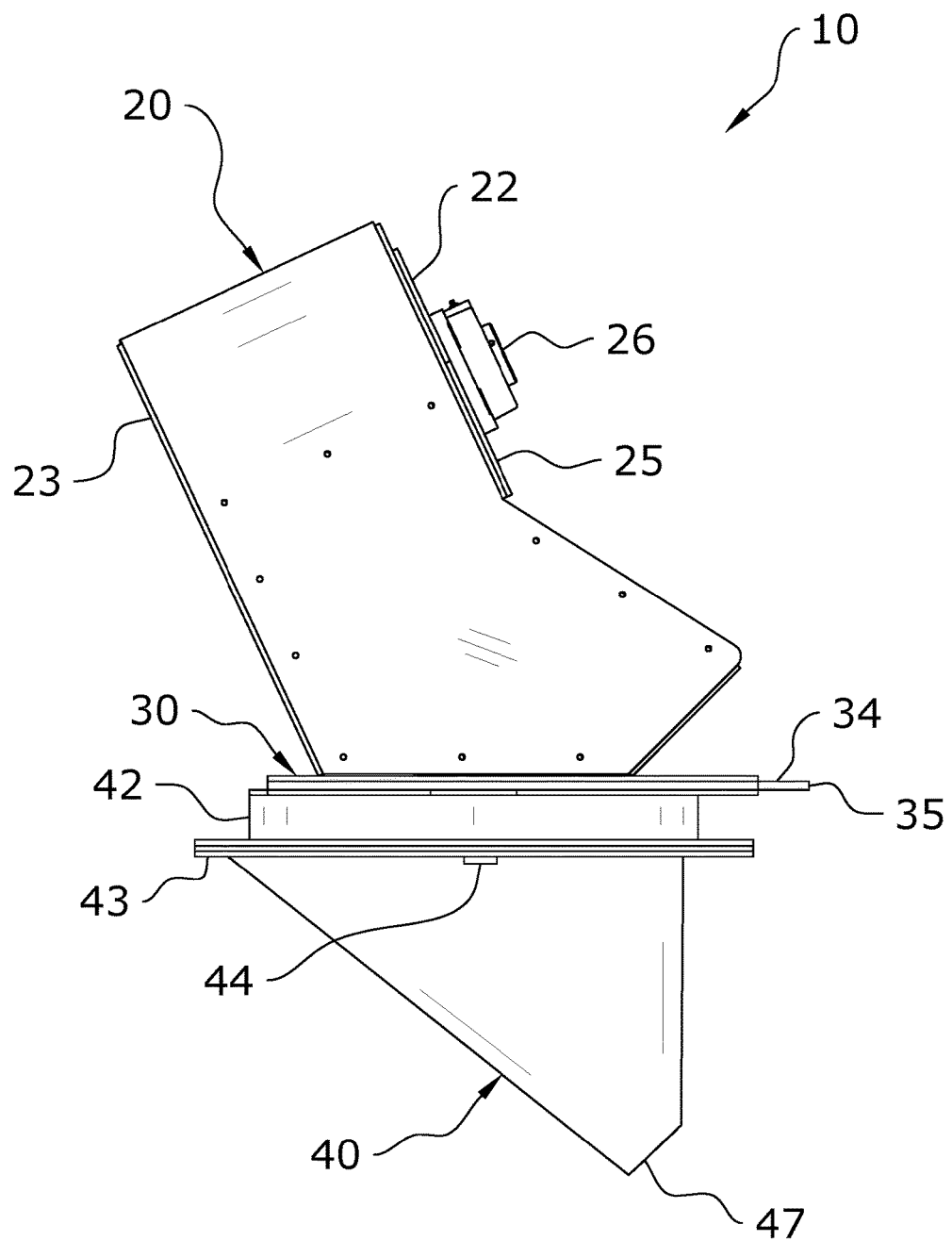
FIG. 9 is a second side view of a material distribution system in accordance with an example embodiment.
Figure 10:
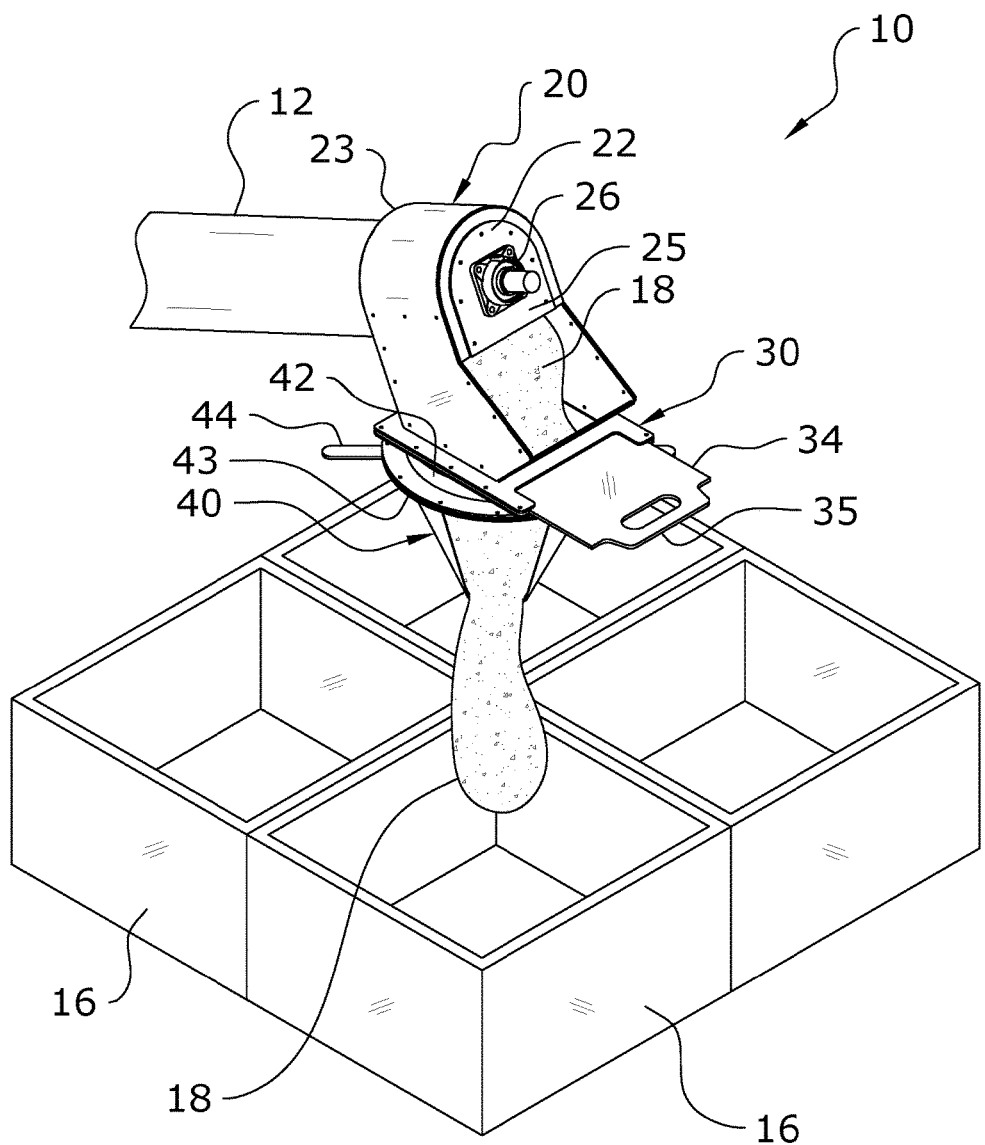
FIG. 10 is a perspective view of a material distribution system filling a first container in accordance with an example embodiment.
Figure 11:
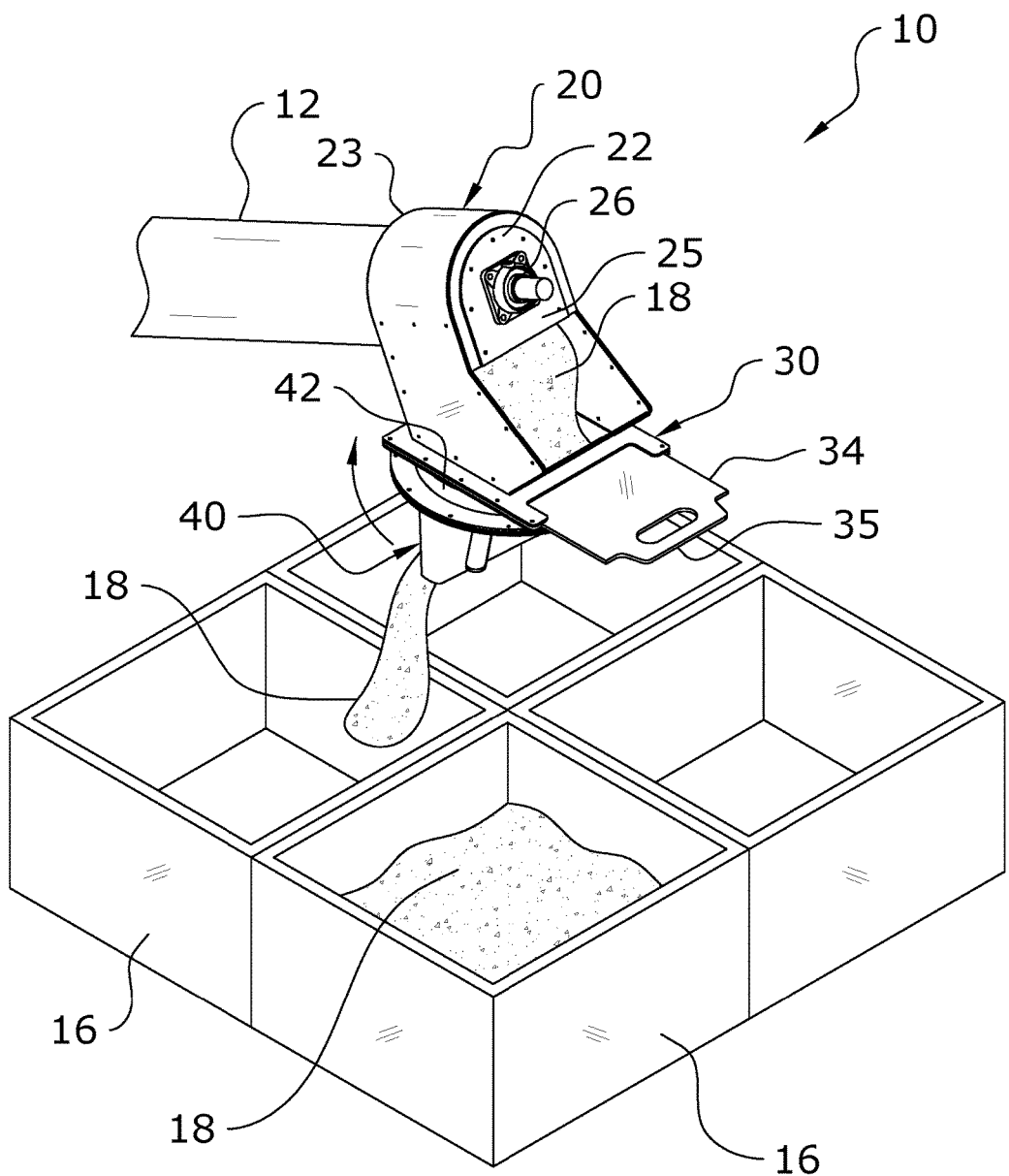
FIG. 11 is a perspective view of a material distribution system filling a second container after rotation of the distributor in accordance with an example embodiment.
Figure 12:
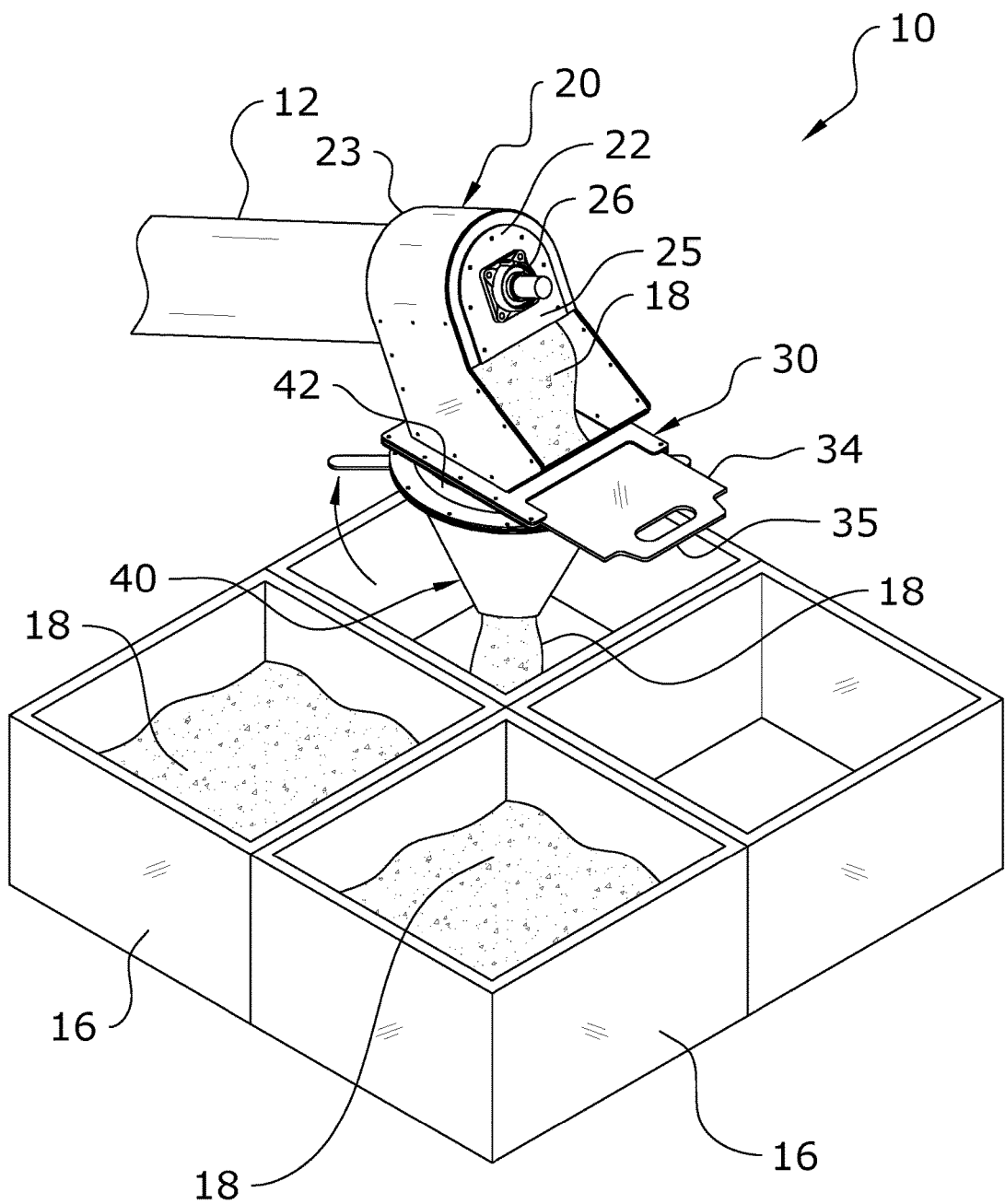
FIG. 12 is a perspective view of a material distribution system filling a third container after rotation of the distributor in accordance with an example embodiment.
Figure 13:
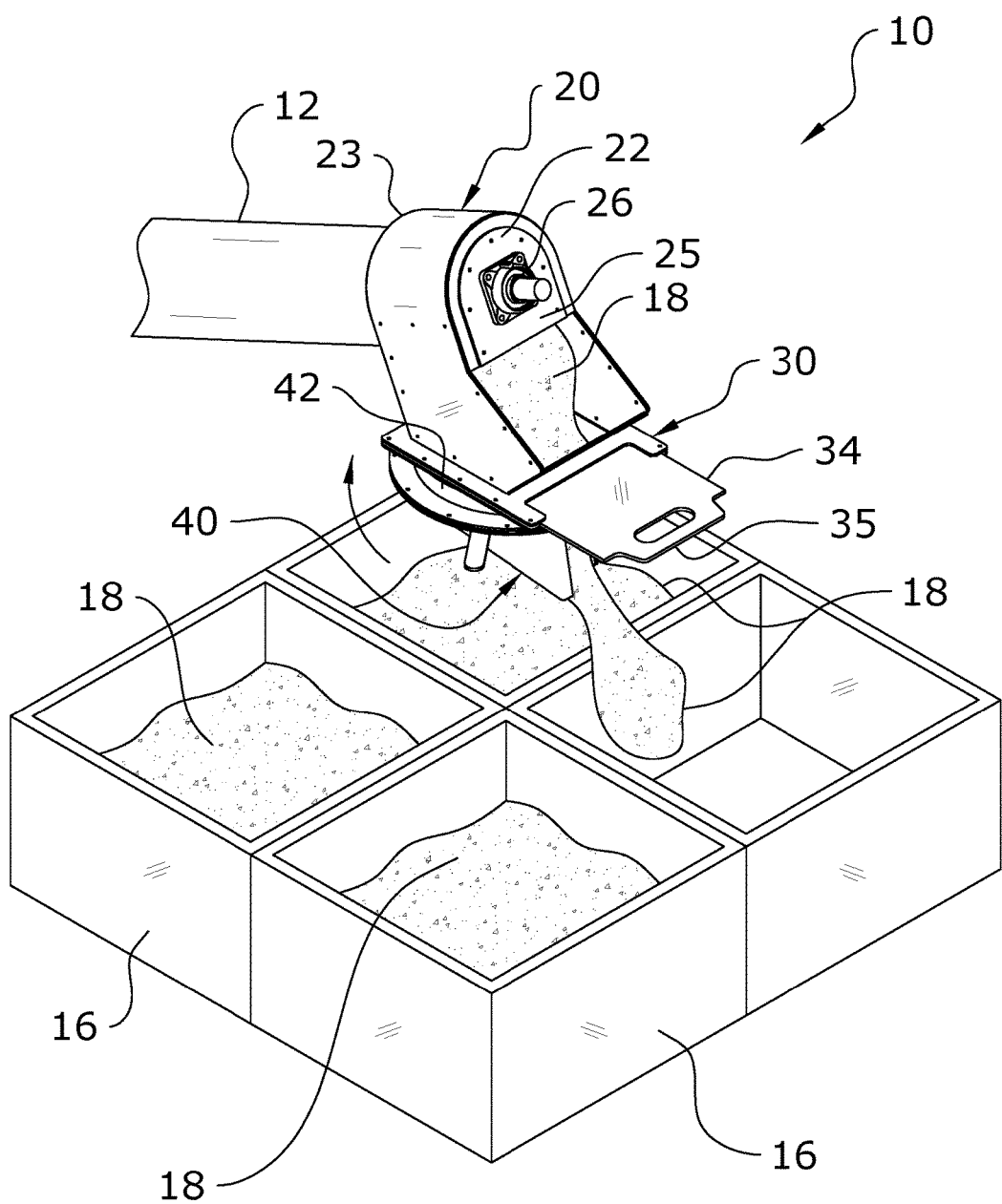
FIG. 13 is a perspective view of a material distribution system filling a fourth container after rotation of the distributor in accordance with an example embodiment.

The distributor 40 may include a base 43 such as shown in FIG. 5. The base 43 may comprise a circular configuration as shown in the figures or may comprise alternate configurations. The base 43 is preferably rotatable with respect to the hopper 20 and is generally positioned at an upper end of the distributor 40. The base 43 may include a base handle 44 such as shown in FIG. 4 which extends outwardly from the base 43. The base handle 44, which may comprise an elongated member as shown in the figures, may be grasped by an operator of the present invention to rotate the distributor 40 between different positions to feed different containers 16.

Figure 14:
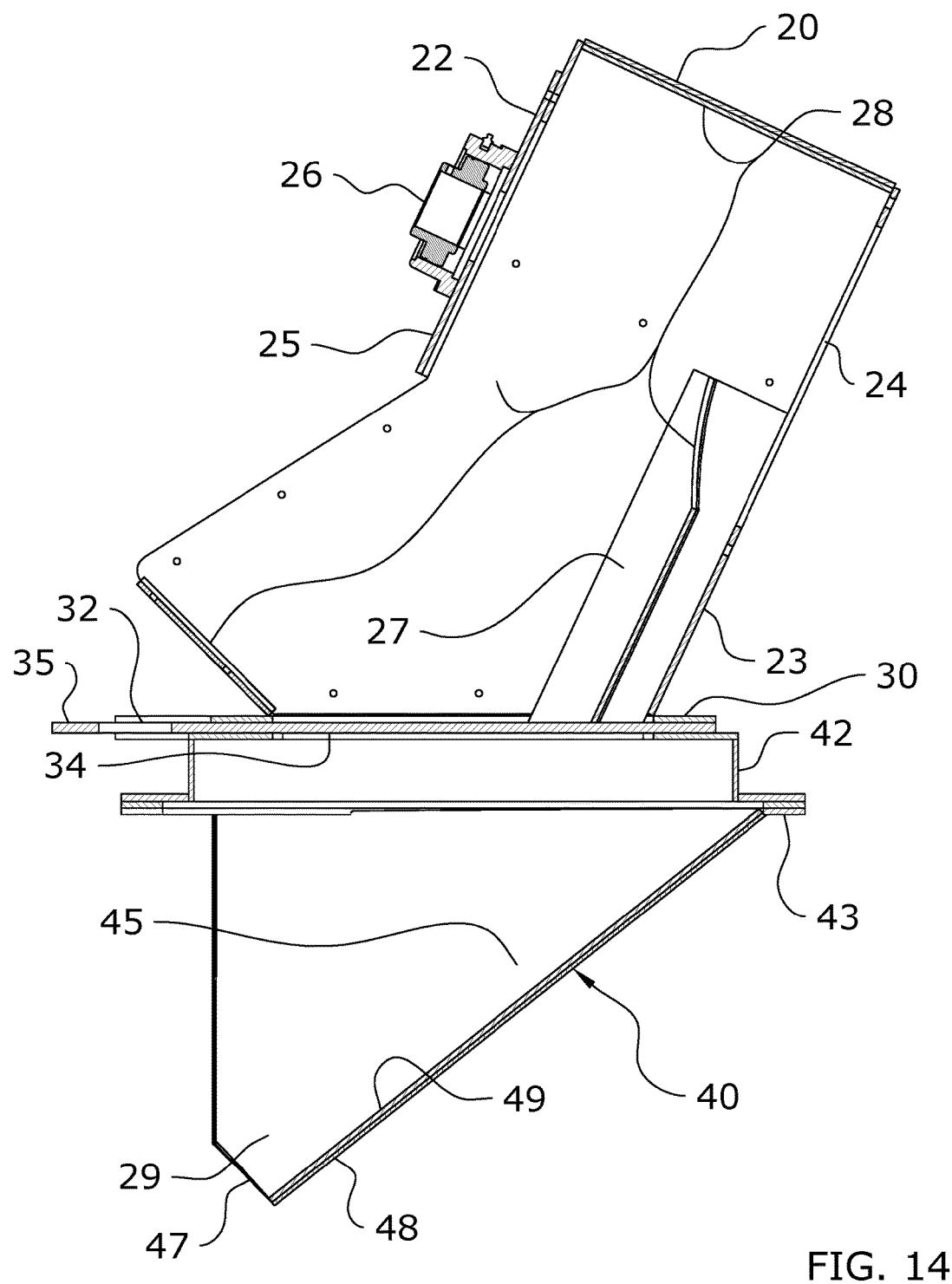
FIG. 14 is a side sectional view of a material distribution system in accordance with an example embodiment.

The distributor 40 will generally include a slide 45 down which the materials 18 will flow toward an outlet 47. The slide 45 may comprise a concave shape as shown in the figures, with curved inner walls 48 curving toward each other and separated by a gap 46; with the outlet 47 being positioned at the lower portion of the inner walls 48. The gap 46 allows an operator to reach in and clear any jams within the distributor 40. The inner walls 48 of the distributor 40 may include a second lining 49 such as a plastic liner as shown in FIG. 14. The second lining 49 provides lubricative properties to ensure that the materials 18 don't get caught on the inner walls 48 of the distributor 40.

F. Operation of Preferred Embodiment

In use, the hopper 20 is first fluidly connected with the feeder 12. The outlet of the feeder 12 is connected to the connector portion 22 of the hopper 20 such that materials 18 from the feeder 12 will enter the hopper 22 via the hopper's 22 receiver opening 24. If the feeder 12 includes an auger 13, the distal end of the auger 13 may be connected to the second end 25 of the connector portion 22 in a rotatable manner, such as by a bearing 26.

With the feeder 12 connected to the hopper 20, the feeder 12 may be activated to convey materials 18 such as a molasses product into the hopper 20 via its receiver opening 24. The materials 18 will fall along the slanted wall 27 of the hopper 20 toward its lower opening 29. If the cutter 34 is pushed inwardly, the lower opening 29 will be covered by the cutter 34 and the materials 18 will pile up on the cutter 34.

By pulling the cutter 34 outwardly, the lower opening 29 may be exposed to allow a portion of the materials 18 to flow through the lower opening 29 and into the distributor 40. The cutter 34 may be pulled outwardly by grasping the cutter handle 35 and applying outward force (such as by pulling) so that the cutter 34 is pulled away from covering the lower opening 29 of the hopper 20. Upon being pulled outwardly, the lower opening 29 will be opened up and a portion of the materials 18 will flow into the distributor 40.

When the desired amount of materials 18 have passed into the distributor 40, the cutter 34 may be pushed back inwardly to cut the portion of the materials 18 off and allow it to naturally flow into the container 16. Materials 18 will remain piled on top of the cutter 34 so that the process may be repeated again.

If it is desired to fill multiple containers 16, the distributor 40 may be rotated so that the outlet 47 is positioned over a second container 16. The distributor 40 is rotated by grasping the base handle 44 and rotating the distributor 40 so that the outlet 47 is positioned over the desired container 16. The process of pulling the cutter 34 outwardly, allowing a portion of the materials 18 to flow into the distributor 40, and then pushing the cutter 34 inwardly again to cut the portion of the materials 18 described above to fill the second container 16 with the portion of the materials 18. These processes may be repeated to fill multiple containers 16 such as shown in FIGS. 10-13.

Put broadly, a method of distributing the material 18 into a plurality of containers 16 may include the steps of feeding a material 18 into a hopper 20 from an auger 13, wherein the hopper 20 comprises a lower opening 29; covering the lower opening 29 with a cutter 34 such that the material 18 is stored within the hopper 20; pulling the cutter 34 away from the lower opening 29 such that a first portion of the material 18 may flow into a distributor 40, wherein the distributor 40 comprises a curved inner wall 48 leading to an outlet 47; pushing the cutter 34 to cover the lower opening 29 and cut the first portion of the material 18 such that the first portion of the material 18 falls along the curved inner wall 48 and out of the outlet 47; filling a first container 16 with the first portion of the material 18; rotating the distributor 40 with respect to the hopper 20 such that the outlet 47 of the distributor 40 is positioned over a second container 18; pulling the cutter 34 away from the lower opening 29 such that a second portion of the material 18 may flow into the distributor 40; pushing the cutter 34 to cover the lower opening 29 and cut the second portion of the material 18 such that the second portion of the material 18 falls along the curved inner wall 48 and out of the outlet 47; and filling the second container 16 with the second portion of the material 18.

Unless otherwise defined, all technical and scientific terms used herein have the same meaning as commonly understood by one of ordinary skill in the art to which this invention belongs. Although methods and materials similar to or equivalent to those described herein can be used in the practice or testing of the material distribution system, suitable methods and materials are described above. All publications, patent applications, patents, and other references mentioned herein are incorporated by reference in their entirety to the extent allowed by applicable law and regulations. The material distribution system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A material distribution system, comprising:
   a hopper adapted to receive a material, wherein the hopper comprises a connector portion having a receiver opening, wherein the hopper comprises a lower opening;
   a feeder connected to the connector portion of the hopper so as to feed the material into the hopper, wherein an outlet of the feeder is connected to the receiver opening of the hopper;
   a distributor connected to the hopper such that the material may flow through the lower opening into the distributor, wherein the distributor comprises a curved inner wall leading to an outlet; and
   a cutter slideably connected between the hopper and the distributor, wherein the cutter is adjustable between a first position covering the lower opening of the hopper and a second position not covering the lower opening of the hopper.

2. The material distribution system of claim 1, wherein the cutter is adapted to cut through the material such that a portion of the material exits the distributor via the outlet.

3. The material distribution system of claim 1, wherein the cutter comprises a blade.

4. The material distribution system of claim 1, wherein the cutter comprises a cutter handle.

5. The material distribution system of claim 1, wherein the distributor is rotatably connected to the hopper.

6. The material distribution system of claim 1, wherein the distributor further comprises a base, wherein the base of the distributor is rotatably connected to the hopper.

7. The material distribution system of claim 6, further comprising a handle extending outwardly from the base of the distributor.

8. The material distribution system of claim 1, further comprising a guide member connected between the hopper and the distributor.

9. The material distribution system of claim 8, wherein the cutter is adapted to slide into and out of the guide member.

10. The material distribution system of claim 1, wherein the material is comprised of molasses.

11. The material distribution system of claim 1, further comprising a first plastic liner covering an interior of the hopper.

12. The material distribution system of claim 11, further comprising a second plastic liner covering the curved inner wall of the distributor.

13. A material distribution system, comprising:
an auger for conveying a material;
a hopper comprising a connector portion having a first end and a second end, wherein the first end of the connector portion of the hopper comprises a receiver opening, wherein the auger is connected to the connector portion of the hopper so as to convey the material into the receiver opening of the hopper, wherein the second end of the hopper comprises a bearing, wherein the bearing is connected to the auger, wherein the hopper is adapted to receive the material from the auger, wherein the hopper comprises a slanted wall beneath the receiver opening, the slanted wall leading to a lower opening of the hopper;
a distributor rotatably connected below the lower opening of the hopper such that the material may flow through the lower opening into the distributor, wherein the distributor comprises a curved inner wall leading to an outlet; and
a cutter slideably connected between the hopper and the distributor, wherein the cutter is adjustable between a first position covering the lower opening of the hopper and a second position not covering the lower opening of the hopper, wherein the cutter is adapted to cut through the material such that a portion of the material exits the distributor via the outlet.

14. The material distribution system of claim 13, further comprising a first plastic liner covering the slanted wall of the hopper.

15. The material distribution system of claim 14, further comprising a second plastic liner covering the curved inner wall of the distributor.

16. The material distribution system of claim 13, further comprising a guide member connected between the hopper and the distributor, wherein the cutter is adapted to slide into and out of the guide member.

17. The material distribution system of claim 13, wherein the material is comprised of a molasses mixture.

18. A method of distributing a material into a plurality of containers, comprising the steps of:
feeding a material into a hopper from an auger, wherein the hopper comprises a lower opening;
covering the lower opening with a cutter such that the material is stored within the hopper;
pulling the cutter away from the lower opening such that a first portion of the material may flow into a distributor, wherein the distributor comprises a curved inner wall leading to an outlet;
pushing the cutter to cover the lower opening and cut the first portion of the material such that the first portion of the material falls along the curved inner wall and out of the outlet;
filling a first container with the first portion of the material;
rotating the distributor with respect to the hopper such that the outlet of the distributor is positioned over a second container;
pulling the cutter away from the lower opening such that a second portion of the material may flow into the distributor;
pushing the cutter to cover the lower opening and cut the second portion of the material such that the second portion of the material falls along the curved inner wall and out of the outlet; and
filling the second container with the second portion of the material.

19. The material distribution system of claim 1, wherein the hopper comprises a slanted wall underneath the receiver opening of the hopper.

20. The material distribution system of claim 19, wherein the connector portion is located at or near an upper end of the hopper.

* * * * *